: US 11,588,668 B2
(45) Date of Patent: Feb. 21, 2023

(12) United States Patent
Muehlmann et al.

(54) CHANNEL EQUALIZER AND CORRESPONDING OPERATING METHOD

(71) Applicant: NXP B.V., Eindhoven (NL)

(72) Inventors: Ulrich Andreas Muehlmann, Graz (AT); Wolfgang Hrauda, Graz (AT); Gregor Hauseder, Graz (AT); Tim Daniel Raspel, Graz (AT)

(73) Assignee: NXP B.V., Eindhoven (NL)

( * ) Notice: Subject to any disclaimer, the term of this patent is extended or adjusted under 35 U.S.C. 154(b) by 60 days.

(21) Appl. No.: 17/232,379

(22) Filed: Apr. 16, 2021

(65) Prior Publication Data

US 2021/0351961 A1 Nov. 11, 2021

(30) Foreign Application Priority Data

May 8, 2020 (EP) ..................................... 20173775

(51) Int. Cl.
*H04L 25/03* (2006.01)
*G06K 7/10* (2006.01)
*H04B 5/00* (2006.01)

(52) U.S. Cl.
CPC .... *H04L 25/03089* (2013.01); *G06K 7/10297* (2013.01); *H04B 5/0056* (2013.01)

(58) Field of Classification Search
CPC ..... H04L 25/03089; H04L 2025/03401; H04L 2025/03687; H04L 2025/03745; H04L 25/0224; H04L 25/03019; H04L 25/0307; H04L 25/0212; G06K 7/10297; H04B 5/0056; H04B 5/0075
See application file for complete search history.

(56) References Cited

U.S. PATENT DOCUMENTS 9,768,984 B2 * 9/2017 Narasimhan ....... G06K 7/10138
2001/0038674 A1 * 11/2001 Trans ..................... H04L 1/0002
370/503
2004/0042545 A1 * 3/2004 Han .................. H04L 25/03057
375/232

(Continued)

FOREIGN PATENT DOCUMENTS

EP 2190156 A2 5/2010
EP 2582069 B1 4/2016

OTHER PUBLICATIONS

"A Normalized Constant-Modulus Algorithm"; Jones; Conference Record of The Twenty-Ninth Asilomar Conference on Signals, Systems and Computers; Oct. 30, 1995-Nov. 1, 1995 (Year: 1995).*

(Continued)

*Primary Examiner* — Benjamin H Elliott, IV

(57) ABSTRACT

In accordance with a first aspect of the present disclosure, a channel equalizer is provided for use in a near field communication (NFC) device, the channel equalizer comprising: a filter configured to receive an input signal and to generate a filtered output signal; an estimator configured to determine filter coefficients to be used by said filter; a synchronizer configured to determine when to enable the channel equalizer and to provide one or more corresponding control signals to the estimator. In accordance with a second aspect of the present disclosure, a corresponding method of operating a channel equalizer for use in a near field communication (NFC) device is conceived.

16 Claims, 8 Drawing Sheets

(56) References Cited

U.S. PATENT DOCUMENTS

| | | | |
|---|---|---|---|
| 2008/0063043 A1* | 3/2008 | Xia | H04L 25/03057 375/232 |
| 2008/0075215 A1* | 3/2008 | Dong | H04L 7/0058 375/355 |
| 2009/0190646 A1* | 7/2009 | Ooi | H04L 25/03057 375/232 |
| 2014/0294055 A1* | 10/2014 | Pustovalov | H04L 25/0202 375/232 |
| 2016/0261436 A1* | 9/2016 | Narasimhan | H04B 5/0075 |
| 2017/0078085 A1* | 3/2017 | Meiyappan | H04L 25/06 |
| 2017/0359202 A1* | 12/2017 | Soulier | H04L 25/03184 |
| 2018/0302263 A1* | 10/2018 | Woodsum | H04B 14/006 |
| 2021/0075649 A1* | 3/2021 | Mahmood | H04L 25/0202 |
| 2021/0351961 A1* | 11/2021 | Muehlmann | H04L 25/0212 |

OTHER PUBLICATIONS

"Blind Equalization Using the Constant Modulus Criterion: A Review"; Johnson et al; Proceedings of the IEEE, vol. 86, No. 10, Oct. 1998 (Year: 1998).*

Lunglmayr, Michael et al.; "Least Squares Equalization for RFID"; Second International Workshop on Near Field Communication; Apr. 20, 2010, Monaco, Monaco; DOI:10.1109/NFC.2010.19.

Raspel, Tim; "Channel Equalization for 13.56 MHz RFID Systems"; Master's Thesis Conducted at the Signal Processing and Speech Communication Laboratory, Graz University of Technology, Austria; Sep. 11, 2018.

* cited by examiner

CHANNEL EQUALIZER AND CORRESPONDING OPERATING METHOD

CROSS-REFERENCE TO RELATED APPLICATIONS

This application claims priority under 35 U.S.C. § 119 to European Patent Application No. 20173775.6, filed on May 8, 2020, the contents of which are incorporated by reference herein.

TECHNICAL FIELD

The present disclosure relates to a channel equalizer. Furthermore, the present disclosure relates to a corresponding method of operating a channel equalizer.

BACKGROUND

Near field communication (NFC) refers to a set of communication protocols that enable two electronic devices to establish communication by bringing them within proximity of each other. The communication range of NFC is typically in the order of centimeters (e.g., 10 centimeters or less). NFC technology can be used to carry out various transactions, such as transactions for accessing buildings, transactions for accessing public transportation sites or vehicles, and payment transactions. For these purposes, physical NFC-enabled transaction cards are often used. Such transaction cards are often referred to as smart cards. Accordingly, different types of transaction cards exist, such as access cards, transit cards and payment cards. Nowadays, NFC-enabled mobile devices such as smart phones may be used to carry out similar transactions. For this purpose, digital representations of physical transaction cards are typically loaded into the mobile devices. These digital representations may be referred to as emulated cards or embedded cards. Furthermore, so-called NFC readers may be used to communicate and exchange data with physical NFC-enabled transaction cards and/or emulated or embedded cards.

SUMMARY

In accordance with a first aspect of the present disclosure, a channel equalizer is provided for use in a near field communication (NFC) device, the channel equalizer comprising: a filter configured to receive an input signal and to generate a filtered output signal; an estimator configured to determine filter coefficients to be used by said filter; a synchronizer configured to determine when to enable the channel equalizer and to provide one or more corresponding control signals to the estimator.

In one or more embodiments, the filter is a finite impulse response filter or an infinite impulse response filter using complex coefficients.

In one or more embodiments, the estimator is an inverse estimator.

In one or more embodiments, the inverse estimator is configured to estimate coefficients of a channel inverse and to set the filter coefficients equal to the coefficients of said channel inverse.

In one or more embodiments, the synchronizer is configured to detect the reception of data, in particular a data frame, included in the input signal and to control the estimator such that channel equalization is only performed during the reception of said data.

In one or more embodiments, the synchronizer is configured to receive a status signal indicative of the reception of data, in particular a data frame, included in the input signal and to control the estimator such that channel equalization is only performed during the reception of said data.

In one or more embodiments, the estimator is configured to apply statically set initial filter coefficients to said filter.

In one or more embodiments, the estimator is configured to estimate initial filter coefficients and to apply the estimated initial filter coefficients to said filter.

In one or more embodiments, the estimator is configured to optimize the filter coefficients using a blind equalization algorithm.

In one or more embodiments, the blind equalization algorithm is a constant modulus algorithm.

In one or more embodiments, the constant modulus algorithm has a configurable step size.

In one or more embodiments, the synchronizer is configured to reset the filter coefficients.

In one or more embodiments, the channel equalizer is embedded in a reader or in a card.

In accordance with a second aspect of the present disclosure, a method of operating a channel equalizer for use in a near field communication (NFC) device is conceived, the channel equalizer comprising a filter, an estimator and a synchronizer, and the method comprising: receiving, by the filter, an input signal and generating a filtered output signal; determining, by the estimator, filter coefficients to be used by said filter; determining, by the synchronizer, when to enable the channel equalizer and providing one or more corresponding control signals to the estimator.

In one or more embodiments, the filter is a finite impulse response filter or an infinite impulse response filter using complex coefficients.

DESCRIPTION OF DRAWINGS

Embodiments will be described in more detail with reference to the appended drawings, in which.

DESCRIPTION OF EMBODIMENTS

Near field communication (NFC) refers to a set of communication protocols that enable two electronic devices to establish communication by bringing them within proximity of each other. The communication range of NFC is typically in the order of centimeters (e.g., 10 centimeters or less). NFC technology can be used to carry out various transactions, such as transactions for accessing buildings, transactions for accessing public transportation sites or vehicles, and payment transactions. For these purposes, physical NFC-enabled transaction cards are often used. Such transaction cards are often referred to as smart cards. Accordingly, different types of transaction cards exist, such as access cards, transit cards and payment cards. Nowadays, NFC-enabled mobile devices such as smart phones may be used to carry out similar transactions. For this purpose, digital representations of physical transaction cards are typically loaded into the mobile devices. These digital representations may be referred to as emulated cards or embedded cards. Furthermore, so-called NFC readers may be used to communicate and exchange data with physical NFC-enabled transaction cards and/or emulated or embedded cards.

Figure 1:
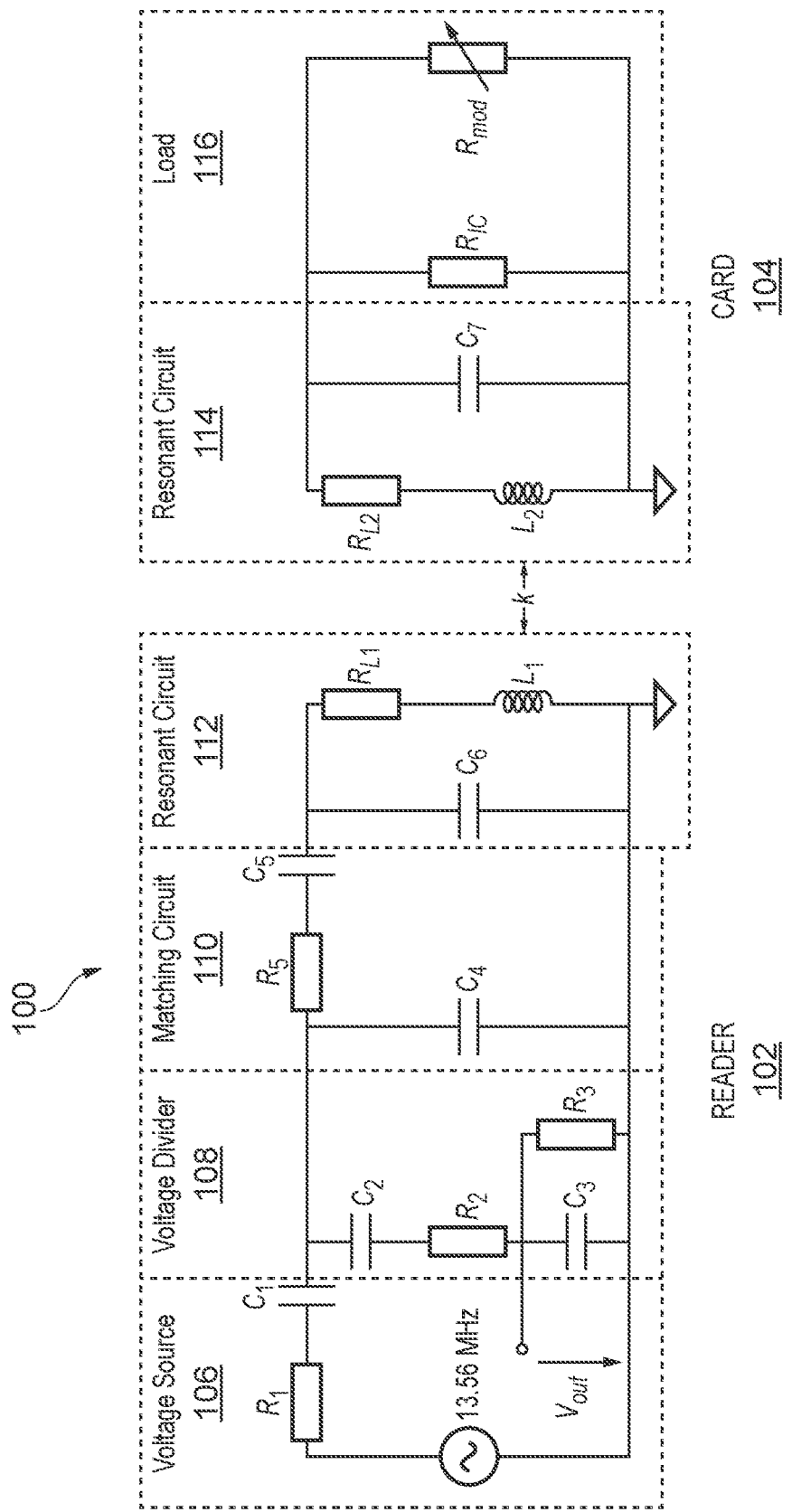
FIG. 1 shows an example of a near field communication (NFC) system.

FIG. 1 shows an example of a near field communication (NFC) system 100. The NFC system 100 comprises a reader 102 and a card 104, which are configured to communicate with each other using inductive coupling. Therefore, the NFC system 100 may also be referred to as a coupling system. The reader 102 includes four main parts. From left to right, these are the voltage source 106 (powering the field, also called carrier, at $f_c$=13.56 MHz), the voltage divider 108, the matching circuit 110, and the resonant circuit 112. The card 104 is represented by a resonant circuit 114, in parallel with two resistances $R_{IC}$ and $R_{mod}$ which together form the load 116 of the card 104. The resistance $R_{IC}$ represents the constant resistive load of the card, while the resistance $R_{mod}$ is used for modulation. By switching the resistance $R_{mod}$ on and off, the reader 102 is able to detect a change in the voltage $V_{out}$, because the reader 102 and the card 104 are inductively coupled. This mechanism of transmitting information is called load modulation. To improve the detection of the change in voltage $V_{out}$ on the reader side, the modulator of the card uses the resistance $R_{mod}$ to modulate a subcarrier onto the field, instead of the data stream. Subsequently, the subcarrier phase is varied over time to transmit information. More specifically, a digital modulation technique called binary phase-shift keying (BPSK) may be applied.

A relevant parameter of the NFC system 100 is the coupling factor k. The coupling factor k is calculated as follows:

$$k = \frac{M}{\sqrt{L_1 L_2}} \quad \text{(Equation 1)}$$

where M is the mutual inductance, $L_1$ is the inductance of the reader loop and $L_2$ is the inductance of the card loop. The value of k lies in the range of 0≤k≤1. If k=0, the reader 102 and the card 104 are fully decoupled as a result of a large distance between them or as a result of magnetic shielding. If k=1, the reader 102 and the card 104 are fully coupled, which means that both coils are subject to the same magnetic flux. Typical values for k range from 0.6 down to 0.01 or lower.

Figure 2:
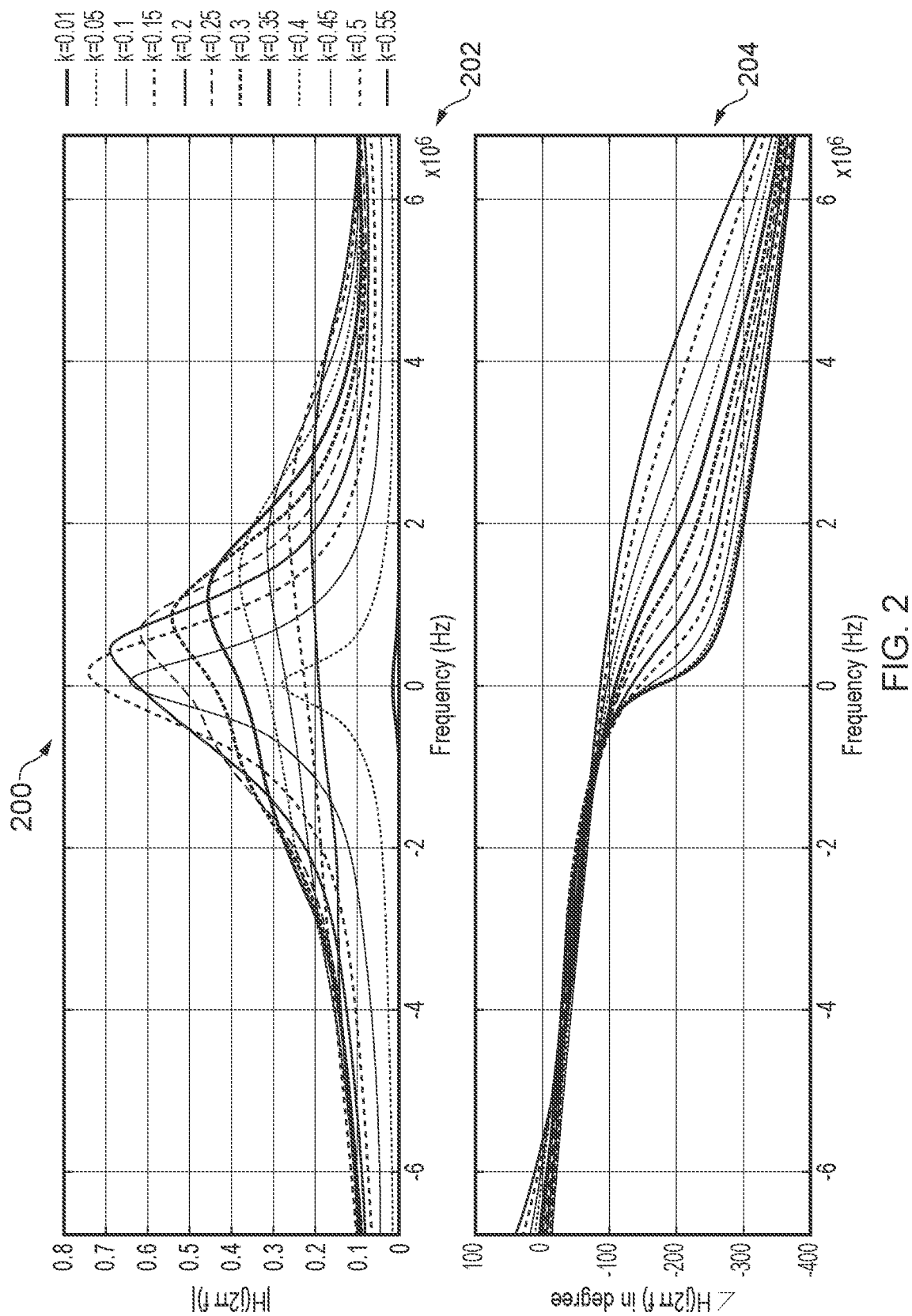
FIG. 2 shows an example of a baseband frequency response of the NFC system.

FIG. 2 shows an example of a baseband frequency response 200 of the NFC system shown in FIG. 1. The coupling factor k is a dynamic factor of the coupling system, because it depends on the distance and orientation of the reader and the card. In FIG. 2, the behavior of a baseband model is shown, which illustrates the effect of different coupling factor values on the baseband frequency response. The baseband model modulates the subcarrier on the carrier, sends the resulting signal through the coupling system and finally performs I/Q-downmodulation. In particular, the upper part of FIG. 2 shows the magnitude 202 of the baseband system H (i.e., the NFC system) over frequency, or, in other words, the gain of the baseband system H at every frequency. The lower part of FIG. 2 show the phase response 204 of the baseband system H, measured in degrees. In other words, the lower part of FIG. 2 shows the difference in phase between the input and output signal of the baseband system H at every frequency. As shown, the frequency response of this baseband model changes significantly with the coupling factor. For k<0.15, the magnitude response is narrowband, causing inter-symbol interference (ISI). As k increases, the magnitude response begins to change shape and becomes broadband. Also, the phase response changes such that the signal passing through experiences a larger phase shift.

Figure 3:
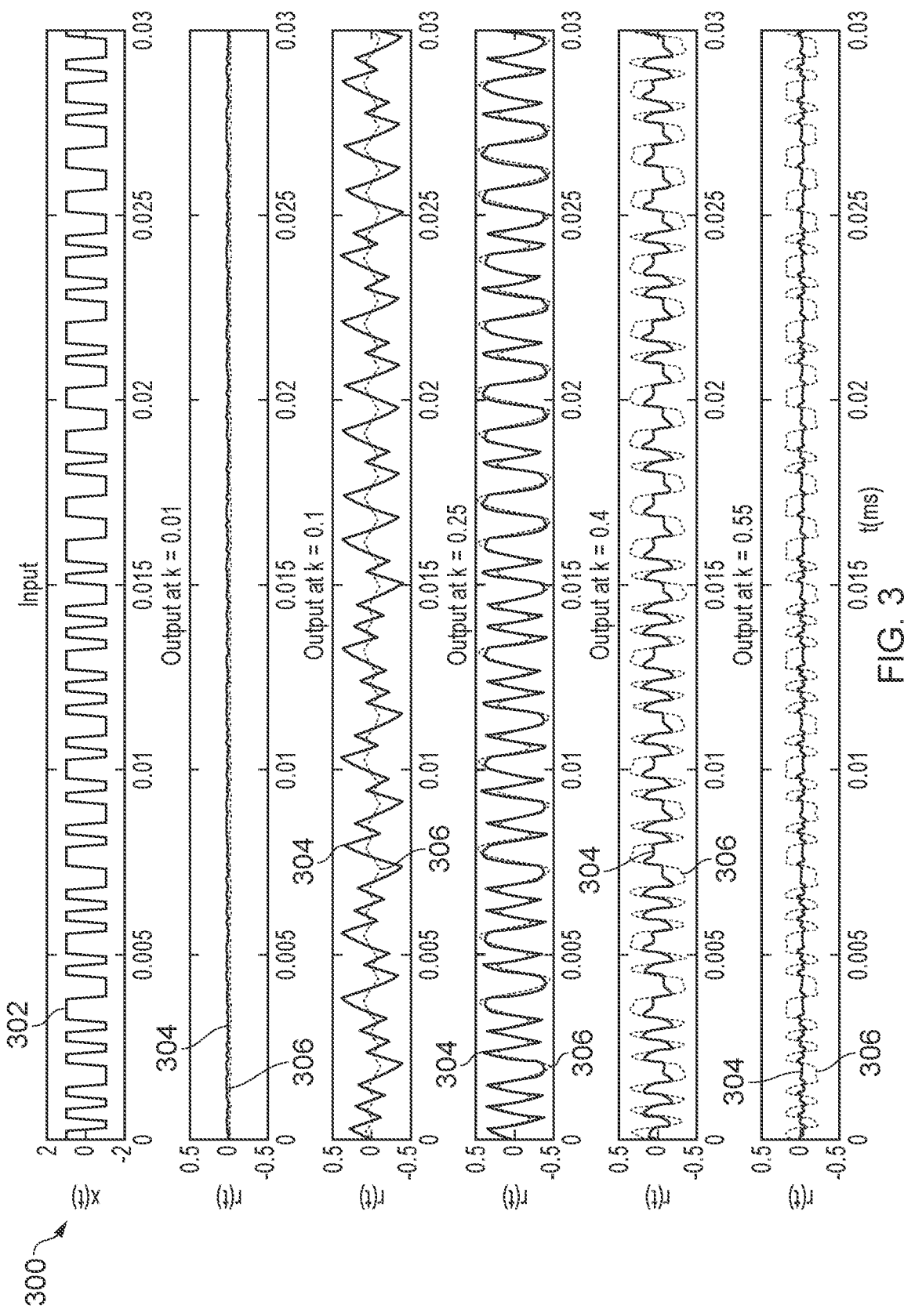
FIG. 3 shows an example of a baseband time response of the NFC system.

FIG. 3 shows an example of a baseband time response 300 of the NFC system shown in FIG. 1. In particular, FIG. 3 shows the effects of different coupling factor values in the time domain. The input signal 302 is a BPSK modulated, rectangular signal. All other shown signals 304, 306 are outputs of the coupling system for different coupling values. The waveform 304 represents the real part of the output signal, while the waveform 306 represents the imaginary part. For a coupling value of k=0.01, the output signal (which is the received signal at the reader side) has such a low amplitude, that the receiver will have trouble detecting the transmission. The corresponding magnitude response for k=0.01 in FIG. 2 shows that nearly all frequencies are blocked. Increasing the coupling factor value leads to an increase in signal strength (up to around k=0.25). For low coupling factor values, a strong distortion of the signal shape can be observed (see FIG. 3 for k=0.1). This distortion is caused by the narrowband characteristic of the coupling system for low coupling values. More specifically, high-frequency components necessary for a rectangular-shaped signal are suppressed. Because the coupling system causes a larger phase shift when k further increases, the Q-channel gains in signal strength compared to the I-channel. For coupling factor values above 0.5, the phase shift amounts to nearly 90°. Thus, the Q-channel carries most of the information and the I-channel becomes negligible. The waveform strongly resembles the input signal due to the broadband frequency response of the coupling system for a high coupling factor k.

Now discussed are a channel equalizer for use in a near field communication (NFC) device and a corresponding method of operating a channel equalizer, which facilitate a robust mitigation of the signal distortion caused by varying distances between and varying orientations of communicating devices in a coupling system of the kind set forth. It is noted that the NFC device can be a reader 102 as shown in FIG. 1, a card 104 as shown in FIG. 1, or any other device configured to carry out near field communication.

Figure 4:
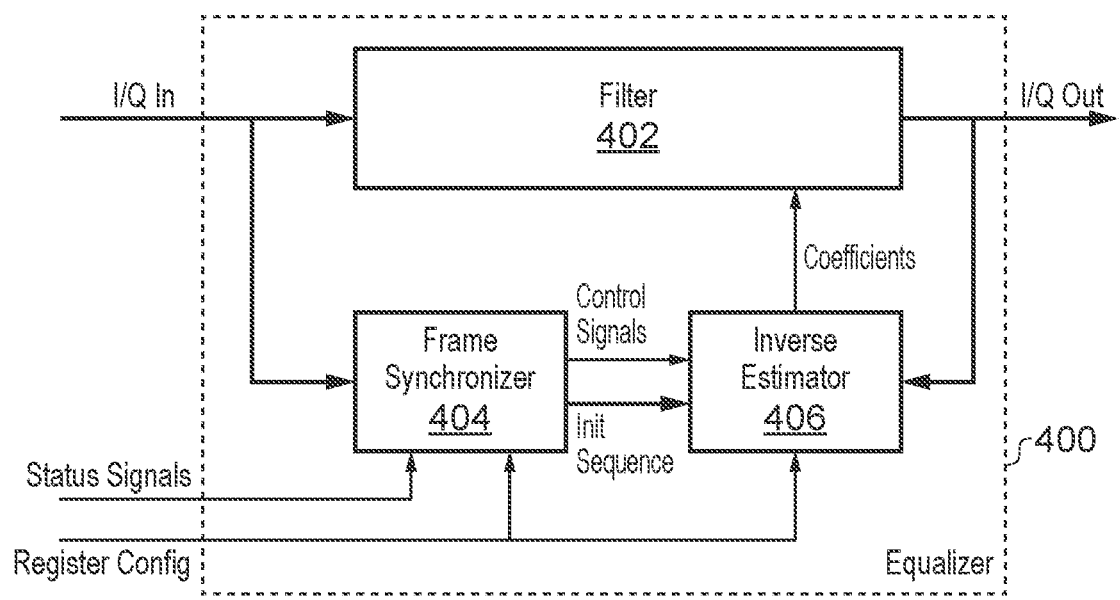
FIG. 4 shows an illustrative embodiment of a channel equalizer.

FIG. 4 shows an illustrative embodiment of a channel equalizer 400. The channel equalizer 400 comprises a filter 402, a frame synchronizer 404 and an inverse estimator 406. The filter 402 is configured to receive an input signal and to generate a filtered output signal. The inverse estimator 406 is an example of an estimator of the kind set forth, which is configured to determine filter coefficients to be used by the filter 402. Furthermore, the frame synchronizer 404 is an example of a synchronizer of the kind set forth, which is configured to determine when to enable the channel equalizer and to provide one or more corresponding control signals to the estimator, as well as a piece of data labeled "Init Sequence". Taken in combination, the filter 402, frame synchronizer 404 and inverse estimator 406 facilitate a robust mitigation of the signal distortion caused by varying distances between and varying orientations of communicating devices in a coupling system of the kind set forth.

In particular, FIG. 4 shows a block diagram of a channel equalizer 400 in accordance with the present disclosure. On the left-hand side, the incoming signal is fed into the equalizer (I/Q In). The incoming signal consists of an I-channel (real part) and Q-channel (imaginary part). In a practical implementation, the filter is a finite impulse response (FIR) filter or an infinite impulse response (IIR) filter using complex coefficients, which are set by the inverse estimator 406. The frame synchronizer 404 makes sure that the equalizer 400 is only active during reception of a data frame and provides the inverse estimator 406 with control signals and an initial sequence (Init sequence). To determine when to enable the equalizer 400, the frame synchronizer 404 may rely on external status signals—in other words, as soon as an external component (not shown) detects an incoming frame, the equalizer may be enabled—or it can have a built-in frame detector. The use of an inverse estimator 406 to determine and set the filter coefficients results in a practical implementation. For example, the inverse estimator 406 may be configured to estimate the coefficients of a channel inverse and to set the filter coefficients equal to the coefficients of the channel inverse.

It is noted that the term "inverse estimator" refers to a component which is configured to estimate an inverse of a communication channel More specifically, an inverse estimator may be a component which determines an approximate inverse H(z) of a system C(z) based on limited information. In the present example, C(z) is the transmission channel (i.e., the communication channel). By applying a signal, which was corrupted by the transmission channel C(z), to H(z), the channel effects can be eliminated. In mathematical terms this can be expressed as follows:

$$H(z) = \frac{1}{C(z)},$$

thus H(z) is the inverse of C(z). The effects of C(z) can be eliminated by H(z), since $$H(z)C(z) = \frac{1}{C(z)}C(z) = 1.$$

As mentioned, the frame synchronizer 404 may have a built-in frame detector. Thus, in one or more embodiments, the synchronizer is configured to detect the reception of data, in particular a data frame, included in the input signal and to control the estimator such that channel equalization is only performed during the reception of said data. In this way, channel equalization is performed only when necessary, while no external component is needed to start and stop the channel equalization. Alternatively, or in addition, the synchronizer is configured to receive a status signal indicative of the reception of data, in particular a data frame, included in the input signal and to control the estimator such that channel equalization is only performed during the reception of said data. In this way, channel equalization is performed only when necessary, while the computational burden on the synchronizer may be reduced.

In particular, controlling the estimator such that channel equalization is only performed during the reception of said data frame may be implemented as follows. The output of the equalizer can either be the filter output (eq$_{out}$=filter$_{out}$) or the equalizer input (eq$_{out}$=eq$_{in}$). If a signal is detected, i.e. the reception of a data frame, either by an internal detector or an external detector, then the filter output may be forwarded to the equalizer output. Otherwise, the equalizer output may equal to the equalizer input. Furthermore, the input of the filter (i.e., the coefficients) as well as any internal data signal of the filter, may be set to zero if no signal is detected (i.e., if no data frame is being received).

In one or more embodiments, the estimator is configured to apply statically set initial filter coefficients to the filter. In this way, the computational burden on the estimator may be reduced, while the channel equalization may still be adequately performed. Furthermore, in one or more embodiments, the estimator is configured to estimate initial filter coefficients and to apply the estimated initial filter coefficients to the filter. In this way, the initial filter coefficients may better fit the conditions of the communication channel. The initial coefficients may for example be estimated using a least squares method. The coefficients of the inverse calculated by the least squares method—or by another method, as the case may be—can be used as initial coefficients for a blind equalization algorithm, such as wNCMA. This is useful, because it reduces the convergence time of the blind equalization algorithm. It is noted that the "Init Sequence" forwarded by the frame synchronizer to the inverse estimator is the part of the incoming signal which the inverse estimator uses to estimate the inverse channel. In the example above, the Init Sequence is the first byte of the incoming frame, which contains a predetermined pattern.

Furthermore, in one or more embodiments, the estimator is configured to optimize the filter coefficients using a blind equalization algorithm. By using such a blind equalization algorithm, the filter coefficients may be adapted dynamically to fit the changing conditions of the communication channel.

It is noted that the term "blind" refers, in the context of digital signal processing, to the mathematical problem of deconvolution, i.e. the process of reversing a signal convolved with for example a filter to its original state. The inverse of this filter is often achieved by means of a training process. In contrast, a blind approach defines loose assumptions (i.e., general properties) about the input, and solves the deconvolution problem using specifically designed nonlinearities in the signal path in order to restore these assumed properties at the output. Thus, it restores an original signal without knowing it (i.e., without "training"), or, in other words, blindly. A particularly suitable blind equalization algorithm is a constant modulus algorithm.

In one or more embodiments, the constant modulus algorithm has a configurable step size. The step-size $\mu$ is a factor in the coefficient update term (as shown in Equation 4) and directly affects how quickly the filter coefficients will converge toward the unknown channel inverse coefficients. If $\mu$ is very small, then the coefficients change only by a small amount at each update, and the filter coefficients converge slowly. With a larger step-size, the filter coefficients converge more quickly. However, when the step-size is too large, the coefficients may diverge, as the equalizer becomes unstable. Finding an optimal value for the step-size may be a time-consuming task, as it typically involves running many simulations and see which step-size value performs best. Since finding an optimal value for the step-size is difficult, and it may have a large impact on the equalization performance, it is useful to keep the step-size configurable by firmware, such that at a later time, this parameter can still be tuned. Accordingly, the step-size may be configured, for example by firmware via a register, at any point in time. However, the step-size typically stays the same during frame reception. Still, it may be possible to implement an adaptive step-size mechanism. For example, a high step-size may be configured in firmware at the beginning of the frame, while a low step-size may be configured towards the end of the frame. Thus, the adaptive step-size mechanism is not restricted to firmware only, but also allows for a hardware implementation.

Furthermore, in one or more embodiments, the synchronizer is configured to reset the filter coefficients. In this way, a user may for example trigger a reset of the filter coefficients in cases where the coefficient values resulting from a blind equalization algorithm are no longer suited for the subsequent equalization of data. It is noted that the reset may be triggered in various ways. For instance, the reset may be triggered by an additional internal component of the equalizer, by a component external to the equalizer, or by a firmware-controlled register field.

In a practical implementation of the channel equalizer, the user may configure multiple parameters, by means of registers that can be read from and written to by firmware. For example, this may be achieved by using the control signal "Register Config" shown in FIG. 4. The following parameters may be configured:

Training On/Off: If Training is activated, the inverse estimator 406 makes use of the frame format. Typically, a frame consists of a Start of Frame (SOF), data, and an End of Frame (EOF). Since for standard protocols, the basic SOF structure is defined, the inverse estimator 406 knows what to expect at the beginning of a frame and can compare this to the actual signal ("Init Sequence"). Based on this comparison, an estimation of the channel inverse is computed. The inverse estimator 406 then sets the filter coefficients equal to the channel inverse coefficients.

Blind Adaption On/Off: If Blind Adaption is activated, the inverse estimator 406 executes a blind equalization algorithm. For example, the well-behaved normalization Constant Modulus Algorithm (wNCMA) is a suitable blind equalization algorithm for equalizing NFC channel effects. It is noted that wNCMA is an algorithm which is fine-tuned for BPSK modulation.

FS Reset On/Off: Enables or disables the frame synchronizer's reset mechanism.

Step-Size: The step-size μ of the wNCMA (see Equation 4).

Initial Coefficients: If Training and Blind Adaption are off, the initial coefficients represent the static filter coefficients. If Blind Adaption is on and Training is off, the filter is first initialized with the Initial Coefficients and subsequently a blind equalization algorithm starts optimizing the coefficients. If Training is on, the Initial Coefficients are ignored, since they are estimated by the inverse estimator 406.

Figure 5:
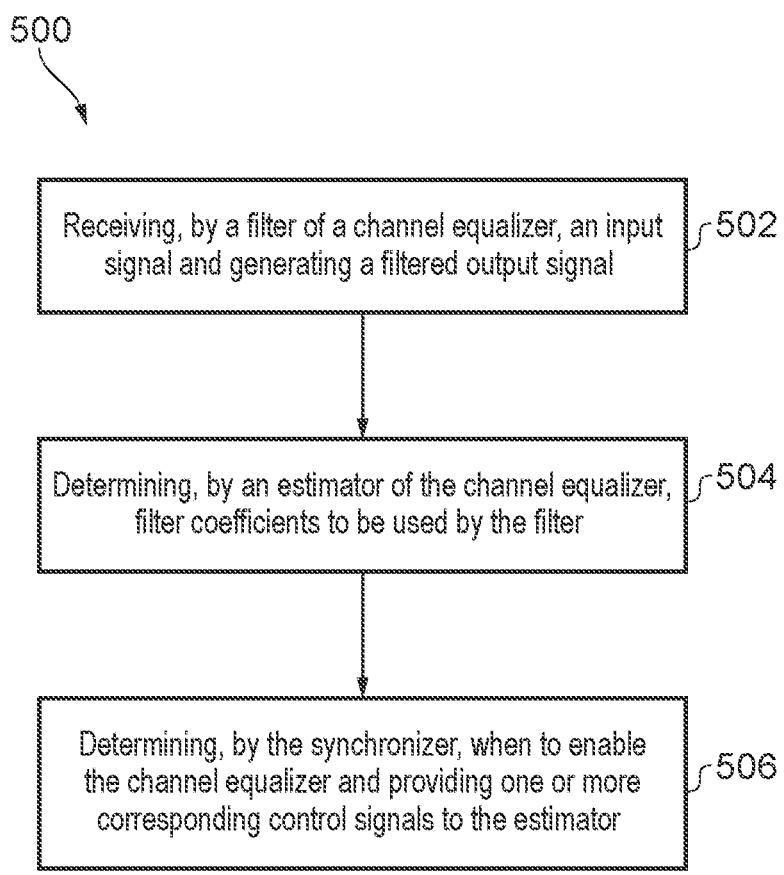
FIG. 5 shows an illustrative embodiment of a method of operating a channel equalizer.

FIG. 5 shows an illustrative embodiment of a method 500 of operating a channel equalizer of the kind set forth. The method 500 comprises the following steps. At 502, a filter of the channel equalizer receives an input signal and generated a filtered output signal. At 504, an estimator of the channel equalizer determines filter coefficients to be used by the filter. Furthermore, at 506, a synchronizer of the channel equalizer determines when to enable the channel equalizer and provides one or more corresponding control signals to the estimator. The method 500 facilitates a robust mitigation of the signal distortion caused by varying distances between and varying orientations of communicating devices in a coupling system of the kind set forth.

Figure 6:
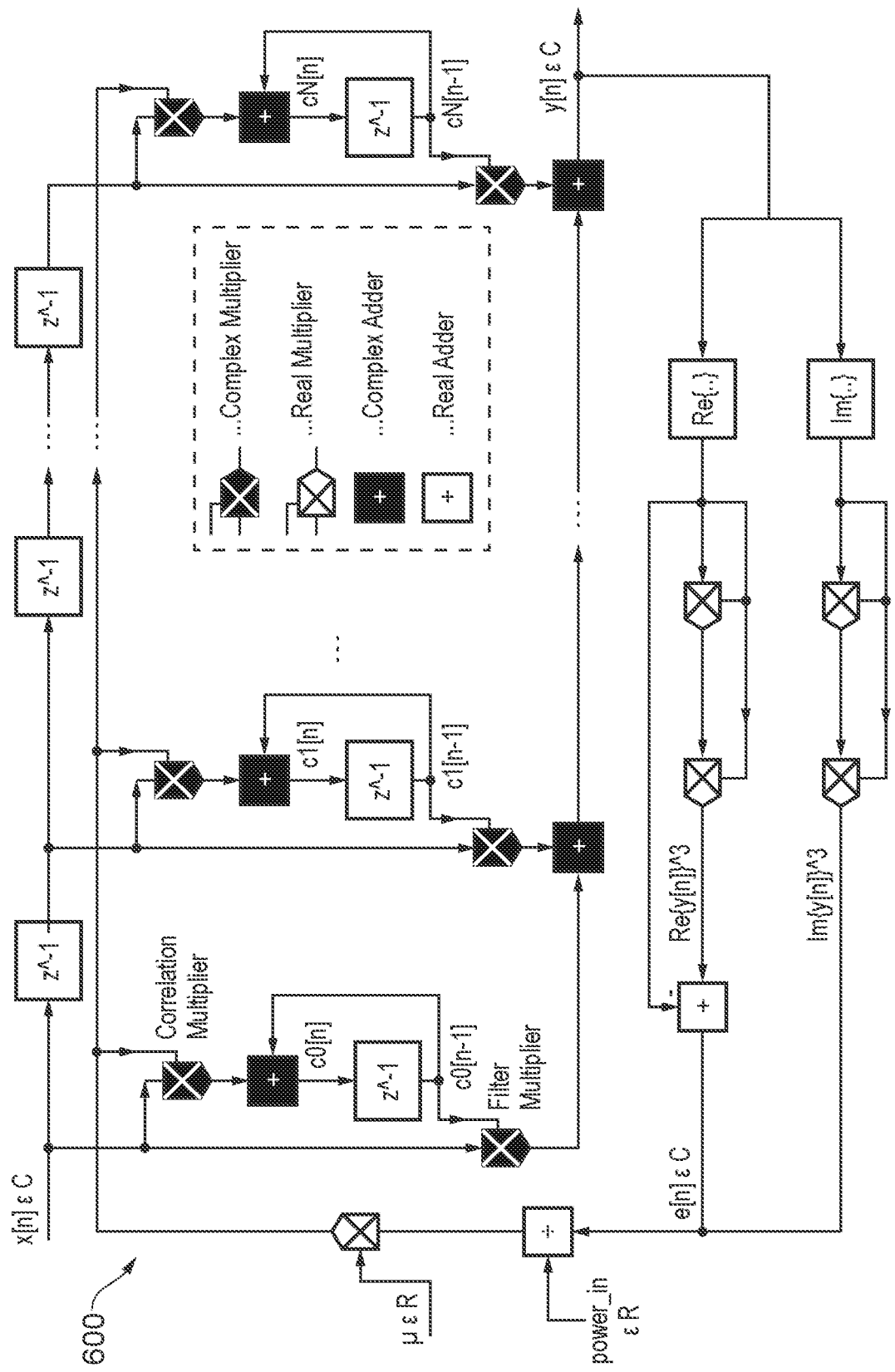
FIG. 6 shows an illustrative implementation of a blind equalization algorithm.

FIG. 6 shows an illustrative implementation 600 of a blind equalization algorithm. In particular, a high-level hardware implementation of the wNCMA is shown. The wNCMA includes three steps, which are filtering, error calculation, and coefficient update. The algorithm uses an FIR filter with complex-valued coefficients. The filter output is calculated as follows:

$$y[n] = c^H[n]r[n] \quad \text{(Equation 2)}$$

where c is the complex-valued coefficient vector and r is the complex-valued input vector. Next, the error is calculated as follows:

$$e[n] = Re\{y[n]\}^3 + j\text{Im}\{y[n]\}^3 - Re\{y[n]\} \quad \text{(Equation 3)}$$

where e is the complex-valued error and y the complex-valued output of the FIR filter. Calculating the error for y=±1 results in zero, showing that a BPS K-signal is optimal.

Finally, the coefficient update is determined as follows:

$$c[n+1] = c[n] + \frac{\mu}{\alpha + \|r[n]\|^2} r[n] e^*[n] \quad \text{(Equation 4)}$$

where c is the complex-valued coefficient vector, μ the step-size, α a constant to avoid division by zero, r the complex-valued input vector and e* the complex conjugate of the error.

Figure 7A:
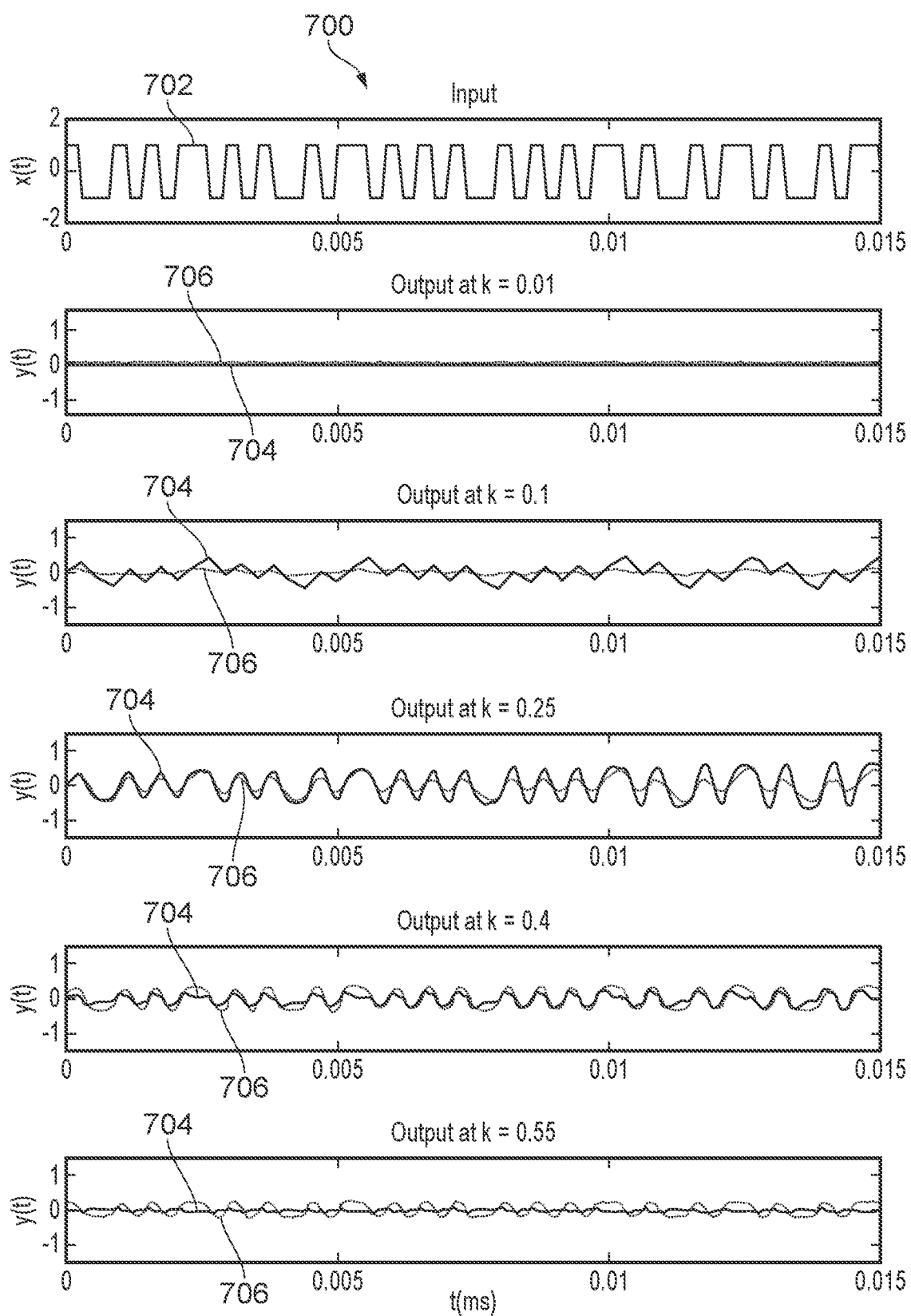
FIG. 7A shows an example of a baseband time response if the channel equalizer is not used.
Figure 7B:
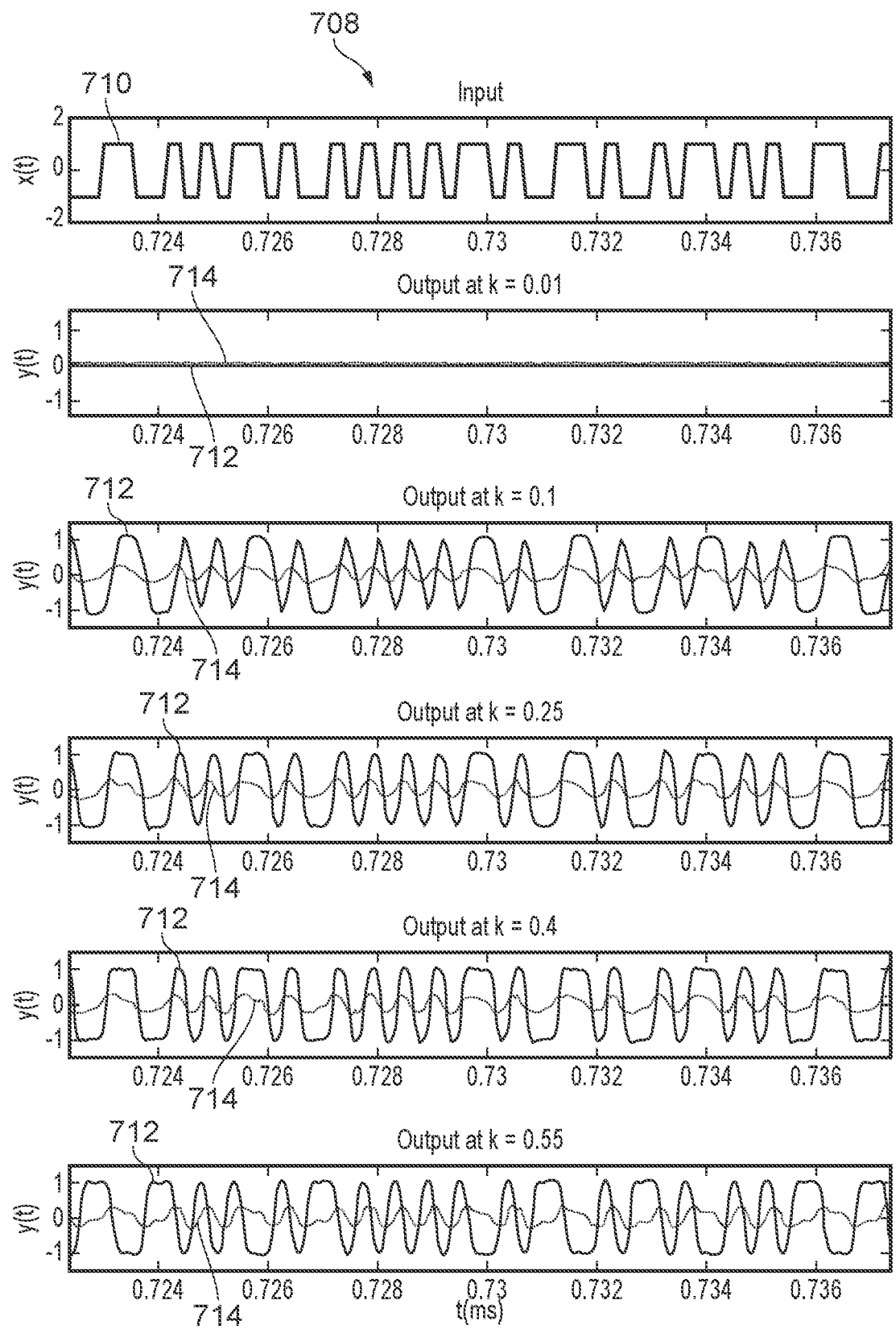
FIG. 7B shows an illustrative embodiment of a baseband time response if the channel equalizer is used.

FIGS. 7A and 7B shows an example of a baseband time response if the channel equalizer is not used 700, respectively an illustrative embodiment of a baseband time response if the channel equalizer is used 702. In particular, FIGS. 7A and 7B illustrate that the equalizer can successfully equalize all channel effects over time (i.e., the channel effects caused by a system with a frequency response as shown in FIG. 2), for any given coupling factor value (given that the coupling factor value is high enough such that a transmission can be detected). It is noted that for coupling factor values above 0.5, the equalizer might run into an inverse solution, as shown in FIGS. 7A and 7B for k=0.55, since the error function cannot distinguish between the original and inverted case. A sophisticated detector should nevertheless be able to cope with this effect.

As mentioned above, the synchronizer may be configured to reset the filter coefficients. In particular, there are cases where the user might want to use Blind Adaption, however only during a part of the frame. For example, consider the Type-B frame format as described in the technical standard ISO/IEC 14443-2 (2016) below. It is noted that PCD stands for Proximity Card Device (the reader), PICC for Proximity Integrated Circuit Card (the card), fc for carrier frequency and fs for subcarrier frequency.

After any command from the PCD, a guard time TR0 should apply in which the PICC should not generate a subcarrier. TR0 should be greater than 1024/fc (~75.5 μs).

The PICC should then generate a subcarrier with no phase transition for a synchronization time TR1. This establishes an initial subcarrier phase reference Ø0. TR1 should be greater than 80/fs.

This initial phase state Ø0 of the subcarrier should be defined as logic "1" so that the first phase transition represents a change from logic "1" to logic "0".

Subsequently, the logic level is defined according to the initial phase of the subcarrier.

Ø0: represents logic "1"

Ø0+180°: represents logic "0"

The standard states that before data is transmitted, a subcarrier without phase transitions is sent for a time period of TR1. The signal during TR1 is quite different from when data is transmitted, since there are no phase transitions. Therefore, if the equalizer is adjusting its coefficients according to a blind equalization algorithm, the resulting coefficients at the end of TR1 might not be suited for the subsequent equalization of data. Thus, the synchronizer has the possibility of detecting the first phase change (which signals the end of TR1) and resetting the filter coefficients. It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 near field communication (NFC) system
102 reader
104 card
106 voltage source
108 voltage divider
110 matching circuit
112 resonant circuit
114 resonant circuit
116 load
200 baseband frequency response of NFC system
202 magnitude of the system
204 phase response of the system
300 baseband time response of NFC system
302 input signal
304 real part of the output signal
306 imaginary part of the output signal
400 channel equalizer
402 filter
404 frame synchronizer
406 inverse estimator
500 method of operating a channel equalizer
502 receiving, by a filter of a channel equalizer, an input signal and generating a filtered output signal
504 determining, by an estimator of the channel equalizer, filter coefficients to be used by the filter
506 determining, by the synchronizer, when to enable the channel equalizer and providing one or more corresponding control signals to the estimator
600 implementation of a blind equalization algorithm
700 baseband time response if the channel equalizer is not used
702 input signal
704 real part of the output signal
706 imaginary part of the output signal
708 baseband time response if the channel equalizer is used
710 input signal
712 real part of the output signal
714 imaginary part of the output signal

The invention claimed is:

1. A channel equalizer for use with binary phase-shift keying (BPSK) modulation in a near field communication, NFC, device, the channel equalizer comprising:
a filter configured to receive an input signal from another NFC device and to generate a filtered output signal;
an estimator configured to determine filter coefficients to be used by said filter, wherein the estimator is configured to generate the filter coefficients using a well-behaved normalized constant modulus algorithm (wNCMA);
a synchronizer configured to determine when to enable the channel equalizer and to provide one or more corresponding control signals to the estimator, wherein the synchronizer is configured to detect reception of a data frame included in the input signal and to control the estimator such that channel equalization is only performed during reception the data frame.

2. The channel equalizer of claim 1, wherein the filter is a finite impulse response filter or an infinite impulse response filter using complex coefficients.

3. The channel equalizer of claim 1, wherein the estimator is an inverse estimator.

4. The channel equalizer of claim 3, wherein the inverse estimator is configured to estimate coefficients of a channel inverse and to set the filter coefficients equal to the coefficients of said channel inverse.

5. The channel equalizer of claim 1, wherein the synchronizer is configured to receive a status signal indicative of the reception of the data frame.

6. The channel equalizer of claim 1, wherein the estimator is configured to apply statically set initial filter coefficients to said filter.

7. The channel equalizer of claim 1, wherein the estimator is configured to estimate initial filter coefficients and to apply the estimated initial filter coefficients to said filter.

8. The channel equalizer of claim 1, wherein the well-behaved normalized constant modulus algorithm has a configurable step size.

9. The channel equalizer of claim 1, wherein the synchronizer is configured to reset the filter coefficients.

10. The channel equalizer of claim 1, wherein the channel equalizer is embedded in a NFC reader or in a card.

11. A method of operating a channel equalizer for use with binary phase-shift keying (BPSK) modulation in a near field communication, NFC, device, the channel equalizer comprising a filter, an estimator and a synchronizer, and the method comprising:
- receiving, by the filter, an input signal from another NFC device and generating a filtered output signal;
- determining, by the estimator, filter coefficients to be used by said filter, wherein the estimator is configured to generate the filter coefficients using a well-behaved normalized constant modulus algorithm (wNCMA);
- determining, by the synchronizer, when to enable the channel equalizer and providing one or more corresponding control signals to the estimator, wherein the synchronizer is configured to detect reception of a data frame included in the input signal and to control the estimator such that channel equalization is only performed during reception the data frame.

12. The method of claim 11, wherein the filter is a finite impulse response filter or an infinite impulse response filter using complex coefficients.

13. The method of claim 11, wherein the estimator is an inverse estimator.

14. The method of claim 13, wherein the inverse estimator estimates coefficients of a channel inverse and sets the filter coefficients equal to the coefficients of said channel inverse.

15. The method of claim 11, wherein the synchronizer receives a status signal indicative of the reception of the data frame.

16. The method of claim 11, wherein the estimator applies statically set initial filter coefficients to said filter.

\* \* \* \* \*